Figure 1:
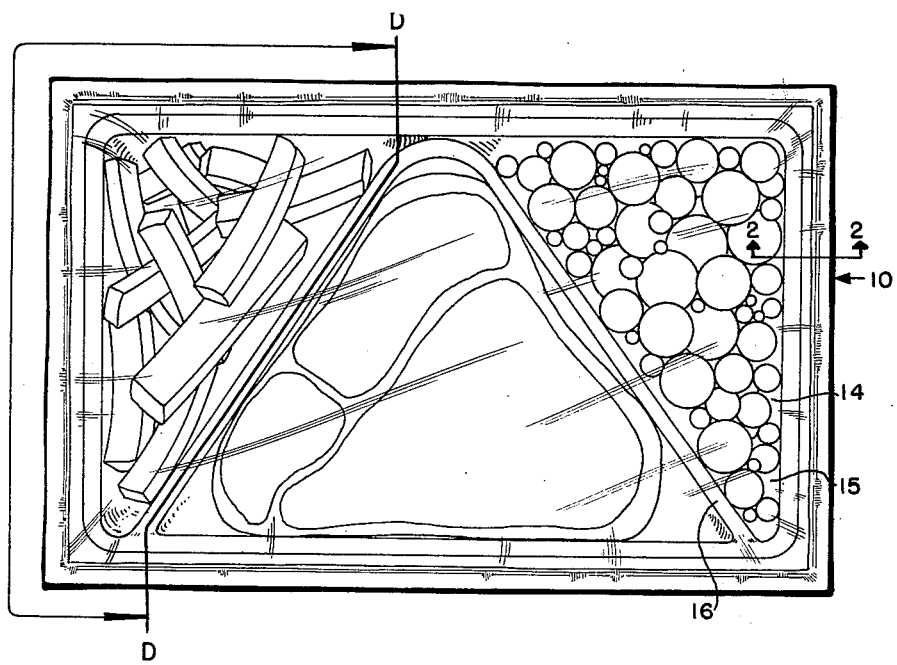

June 8, 1965   W. T. SNOW, JR   3,188,215
FROZEN FOOD PACKAGE AND METHOD FOR PRODUCING SAME
Filed April 9, 1963

United States Patent Office

3,188,215
Patented June 8, 1965

3,188,215
FROZEN FOOD PACKAGE AND METHOD
FOR PRODUCING SAME
William T. Snow, Jr., Greenville, S.C., assignor to W. R.
Grace & Co., Duncan, S.C., a corporation of
Connecticut
Filed Apr. 9, 1963, Ser. No. 271,740
2 Claims. (Cl. 99—192)

This invention relates to a method for packaging and/or preparing frozen food dinners, more particularly those dinners now quite commonly known as TV dinners.

Packaged frozen foods, especially frozen food dinners (such as "TV" dinners), have become increasingly popular with the consuming public in recent years. The dinners are, at present, placed in aluminum trays and then covered with an aluminum foil that is securely attached over the tray, by crimping for example. The entire package is frozen and maintained in such frozen condition until time for consumption. The entire package is, according to manufacturer instructions, then placed in a preheated oven usually maintained at about 425–450° Farenheit until the contained food is sufficiently heated for consumption. Depending upon the particular food in the dinner (e.g., chicken, ham, fish, etc.) required heating times vary from about 15 to about 30 minutes, more or less.

Various problems arise in the manufacture and use of the above described presently known packaged heat-and-eat frozen dinners. As noted, the only covers presently in use are made of aluminum foil. The relative stiffness of this material creates many handling problems. In semiautomatic or automatic cartoning machines, the foil invariably causes frequent jamming, resulting in many nonacceptable packages which must be covered anew or disposed of as waste.

In certain dinners, e.g., those containing portions of French fried potatoes, or other like foods, the aluminum foil covered packages must be provided with lift flaps that can be peeled back from such portions, so that partial dehydration of the exposed food can occur during cooking. As above noted relatively high oven temperatures are also required when heating aluminum foil covered containers in order to heat the contained frozen food to temperatures at which it can be consumed in a reasonable amount of time.

It is an object of this invention to provide an improved method of packaging heat-and-eat frozen food dinners.

It is a further object of this invention to provide a method of packaging frozen food dinners which is inexpensive, relatively simple and virtually free of production rejects.

Still another object of the invention is to provide a packaged frozen food dinner that can be oven heated to desired temperatures at considerably lower temperatures than corresponding aluminum foil covered dinners but nevertheless in substantially the same period of time.

Yet another object is to provide packaged frozen dinners from which portions of the cover can if desired or necessary be automatically drawn back during the heating cycle.

Figure 2:
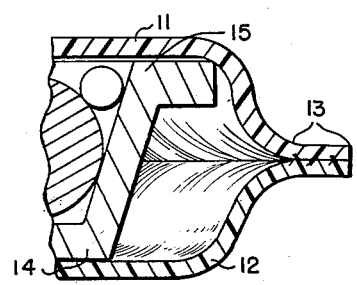

Other objects and advantages of the invention will be readily apparent from the following more detailed description and the accompanying drawing, in which:

FIGURE 1 is a plan view of a frozen food dinner package of this invention as it would appear just prior to the final production steps; and FIGURE 2 is a fragmentary enlarged sectional view taken substantially on line 2—2 of FIGURE 1.

It has been found that the objectives can be accomplished by placing precooked food portions in the usual compartmented aluminum tray enclosing the tray in a single layer overwrap of thin, transparent, heat shrinkable biaxially oriented polypropylene film, sealing together the upper and lower overwrap layers about the periphery of the tray such sealing being sufficient to provide over at least the major portion and preferably throughout the complete circumference of the seal area a seal strength of at least about 3 pounds per linear inch, briefly heating the overwrapped package to shrink the peripherally sealed film into tight engagement with the tray, and then quick freezing the thus packaged dinner. The frozen dinner is then stored under refrigeration until it is to be consumed.

According to the invention the sole protective cover for the food-containing tray is a single layer peripherally sealed enclosing overwrap of biaxially oriented polypropylene film. Such films have excellent physical properties and thus can withstand considerable handling abuse. In addition the film is quite heat stable, permitting oven heating of the packaged dinner while it is still enclosed within the film overwrap. This in turn results in excellent retention of appearance and palatability of the cooked dinner because of the very low moisture vapor transmission of the film.

Biaxially oriented, heat shrinkable polypropylene films useful in this invention can be made by methods known in the art such as that described, for example, in Baird et al., U.S. Patent 3,022,543 (issued Feb. 27, 1962). The entire disclosure of this Baird et al patent is incorporated herein by reference. As noted in the patent such films have relatively very high shrink energies. Thus it is absolutely essential for the practice of this invention to have seal strengths of at least about 3.0 pounds per linear inch. If the seal strength is measurably lower than this value e.g., 2.8 pounds per inch or less the seal will delaminate during heating, the film overwrap will peel back and the dinner will be generally unsatisfactory for consumption.

Turning now to the drawings, it is seen that the improved package 10 of this invention comprises generally the usual aluminum tray 14 and an overwrapping film the upper and lower layers of which are designated 11 and 12, respectively. The film thickness may vary from about 0.0005 to about 0.0006 inch, as desired. The tray is divided into compartments in the usual manner by dividing wall or walls 16, and usually has a flange 15 at its upper periphery. Into the compartments are placed the various precooked food portions which make up the dinner, e.g., a suitable meat or fish, some type of vegetable or vegetable or vegetable mix, and potatoes. For purposes of disclosing a particular embodiment of the invention the potatoes in the illustrated package are French fried potatoes.

The tray is then enclosed in a single layer overwrap of biaxially oriented, heat shrinkable polypropylene film. The overwrap may be made from large single sheet folded over at its center and peripherally sealed around three sides of the tray or, as shown, the overwrap may be made from two separate sheets 11 and 12 between which the tray is placed before the layers are sealed together, as at 13, around the tray periphery. The overwrapped peripherally sealed package is then briefly heated, for 30 to 120 seconds for example, at temperatures between about 270° to about 320° Fahrenheit to shrink the overwrap into tight fitting relationship with the tray. This greatly enhances the appearance of the package.

The sealed package is then quick frozen in well known manner and then is retained under refrigeration until ready for preparation and consumption of the dinner. If desired or deemed necessary tray of frozen food can be placed in a paperboard carton or other like container to ensure freedom from physical damage or abuse.

In use of the package it is placed, in a preheated oven maintained at about 300° to about 320° Fahrenheit until the food reaches a temperature suitable for serving. It has been observed in actual comparative tests that food in packages of this invention will reach suitable temperatures in about the same period at 300° Fahrenheit as it will in aluminum foil covered packages heated at 450° Fahrenheit. The advantages of this very substantial difference in heating temperature requirements are obvious.

It is also possible to have automatic partial peel back of the cover while heating, is desired. This would be true, for example, when the potato portion is French fried and thus requires some dehydration. This result is accomplished by decreasing the strength of the seal area around that compartment of the tray which contains this portion to a value below about 2.8 pounds per linear inch. In the drawings, this seal area would be that along the line $d$ in FIGURE 1. In this case, after a short period of time (e.g. 2 or 3 minutes) in the oven at the above noted temperatures this seal area will delaminate and the subsequent film shrinkage will expose the selected tray compartment. It is also possible to dehydrate selected food portions by selectively perforating the film layer 11 in those areas overlying the compartment containing such portions.

Of course, where it is not desired to dehydrate any food portion the entire seal is provided with sufficient strength (fully described above) to preclude any delamination during the entire heating period.

The seal strength values discussed hereinabove are determined by fully restraining a layer of film on one side of the seal, pulling the other layer until the seal is fully broken, and measuring the force required to break the seal. The seal strength is then determined by dividing this measured force by the length (in inches) of the seal. The tests are made at about room temperature, e.g., 60–70° Fahrenheit.

What is claimed is:
1. Packaged precooked frozen food dinner comprising
   (a) a compartmented aluminum tray,
   (b) dinner food portions disposed in compartments in said tray, a first compartment containing a food portion which requires dehydration during heating,
   (c) as the sole protective wrapping thereof a tight fitting single layer enclosing overwrap of thin, transparent, biaxially oriented, heat shrinkable polypropylene film, said overwrap being heat sealed together peripherally of said tray,
   (d) the peripheral seal extending around the outer perimeter of said first compartment having a strength of less than about 2.8 pounds per linear inch whereby this lesser strength seal delaminates and shrinks upon heating the container thereby exposing the food requiring dehydration and thus enhancing dehydration, and
   (e) the peripheral seal extending around the remainder of said tray having a seal strength of at least about 3.0 pounds per linear inch and sufficient to prevent substantial delamination of said seal when the overwrapped tray is heated to about 320° F.

2. A method of preparing packaged pre-cooked frozen food dinners comprising
   (a) placing precooked unfrozen food portions comprising said dinner in a compartmented tray, a first compartment of said tray containing a food portion requiring dehydration during heating,
   (b) enclosing said tray in a single layer overwrap of thin, transparent heat shrinkable polypropylene film,
   (c) heat sealing together the enclosing overwrap about the periphery of said first compartment so as to provide a seal strength of less than about 2.8 pounds per linear inch,
   (d) heat sealing together the enclosing overwrap about the remainder of the periphery of said tray so as to provide a seal strength of at least about 3.0 pounds per linear inch,
   (e) briefly heating the entire package to heat shrinking temperatures to shrink the enclosing overwrap into tight fitting relation with the tray, and
   (f) freezing the resultant package,
   (g) said seal provide in step (c) delaminating and shrinking when the resultant frozen package of step (f) is subsequently heated to a temperature in the range of 270 to 320° F. thereby exposing the food requiring dehydration and thus enhancing dehydration, while said seal provided in step (d) remains in tact.

References Cited by the Examiner
UNITED STATES PATENTS

| 2,495,435 | 1/50 | Welch | 99—171 |
| 2,674,536 | 4/54 | Fisher | 99—192 |
| 2,878,128 | 3/59 | Jorgenson | 99—192 |
| 3,022,543 | 2/62 | Baird et al. | 99—174 |
| 3,028,000 | 4/62 | Clements et al. | |
| 3,092,246 | 6/63 | Harrison et al. | 99—171 X |

OTHER REFERENCES

Woodroff et al.: "Refrigerating Engineering," February 1954, pages 45–48, page 46 being relied upon.

A. LOUIS MONACELL, *Primary Examiner.*